United States Patent
Simon et al.

(10) Patent No.: US 7,672,686 B2
(45) Date of Patent: Mar. 2, 2010

(54) METHOD FOR ADJUSTING A TRANSMITTING POWER IN A WIRELESS COMMUNICATIONS NETWORK

(75) Inventors: Gwendal Simon, Versailles (FR); Joaquin Keller, Paris (FR)

(73) Assignee: France Telecom, Paris (FR)

( * ) Notice: Subject to any disclaimer, the term of this patent is extended or adjusted under 35 U.S.C. 154(b) by 938 days.

(21) Appl. No.: 10/573,509

(22) PCT Filed: Sep. 20, 2004

(86) PCT No.: PCT/FR2004/002367

§ 371 (c)(1),
(2), (4) Date: Mar. 27, 2006

(87) PCT Pub. No.: WO2005/032067

PCT Pub. Date: Apr. 7, 2005

(65) Prior Publication Data

US 2007/0060185 A1    Mar. 15, 2007

(30) Foreign Application Priority Data

Sep. 25, 2003   (FR) .................................. 03 11246

(51) Int. Cl.
| H04M 3/00 | (2006.01) |
|---|---|
| H04W 4/00 | (2009.01) |
| H04W 40/00 | (2009.01) |
| H04W 24/00 | (2009.01) |
| H04M 1/00 | (2006.01) |
| H04B 1/38 | (2006.01) |
| H04B 7/00 | (2006.01) |
| H04J 11/00 | (2006.01) |

(52) U.S. Cl. ............... 455/522; 455/418; 455/422.1; 455/446; 455/456.1; 455/550.1; 455/561; 370/207; 370/338

(58) Field of Classification Search .............. 455/11.1, 455/13.1–13.4, 41.2, 68–70, 418–421, 422.1, 455/453, 517, 522–526, 550.1, 556.2, 561, 455/574, 127.1–127.2, 127.5, 434, 435.1, 455/446–448, 456.1, 456.5–456.6, 466, 507, 455/514; 370/311–312, 316, 328, 338, 447, 370/206–208; 713/300–321, 330–331; 340/7.32–7.36, 340/7.39–7.41

See application file for complete search history.

(56) References Cited

U.S. PATENT DOCUMENTS 6,553,228 B1 * 4/2003 Kotzin ..................... 455/434

(Continued)

FOREIGN PATENT DOCUMENTS

WO    WO 02/03567    1/2002

OTHER PUBLICATIONS

International Search Report dated Feb. 23, 2005 with English translation (6 pgs).

(Continued)

*Primary Examiner*—Meless N Zewdu
(74) *Attorney, Agent, or Firm*—Drinker Biddle & Reath LLP

(57) ABSTRACT

Entities of a wireless communication network adjacent to a given sending entity, i.e. entities of the network from which the sending entity is able to receive messages are identified. Among the adjacent entities, a minimum constellation associated with the sending entity is further identified as the smallest set of entities adjacent to the sending entity and included in a circle centered on the sending entity such that at least three of the entities of the set form a convex polygon circumscribing the sending entity. The transmitting power of the sending entity is then adjusted to a value sufficient for the messages sent by the sending entity to reach all the entities of the minimum constellation associated therewith.

20 Claims, 4 Drawing Sheets

U.S. PATENT DOCUMENTS

| | | | |
|---|---|---|---|
| 6,697,375 B1* | 2/2004 | Meng | 370/465 |
| 6,697,650 B2* | 2/2004 | Hulyalkar | 455/574 |
| 6,907,229 B2* | 6/2005 | Shpak | 455/69 |
| 7,085,290 B2* | 8/2006 | Cain et al. | 370/469 |
| 7,340,267 B2* | 3/2008 | Budka et al. | 455/522 |
| 2003/0032462 A1* | 2/2003 | Wang et al. | 455/574 |
| 2003/0060168 A1 | 3/2003 | Teibel | 455/69 |
| 2004/0131025 A1* | 7/2004 | Dohler et al. | 370/328 |
| 2005/0053005 A1* | 3/2005 | Cain et al. | 370/235 |

OTHER PUBLICATIONS

Ryu J-H et al., "Energy-conserving clustering scheme for multicasting in two-tier mobile ad-hoc networks", Electronics Letters, IEE Stevenage, GB, vol. 37, pp. 1253-1255 (2001).

Taek J K et al., "Clustering with power control", IEEE, pp. 1424-1428 (1999).

* cited by examiner

METHOD FOR ADJUSTING A TRANSMITTING POWER IN A WIRELESS COMMUNICATIONS NETWORK

RELATED APPLICATIONS

The subject application is a U.S. National Stage application that claims the priority of International Application No. PCT/FR2004/002367, filed on 20 Sep. 2004, which claims the priority of French National Application No. 03 11246, filed on 25 Sep. 2003.

BACKGROUND OF THE INVENTION

The invention concerns the field of wireless networks, made up of a plurality of entities intercommunicating, for example by radio channel.

More specifically, the invention relates to a method of adjusting the sending power—also called the transmitting power—of the network entities. It also relates to a wireless communication unit intended to form an entity of such a network.

The invention applies particularly to ad hoc networks, i.e. networks that do not have a pre-existing infrastructure for sending data from one entity to another.

It should be remembered that, in the field of radio waves, any signal transmitted by a sending entity to a destination entity is subject to an attenuation proportional to a power of the distance separating these entities (in practice, this power is between 2 and 6).

That is why the transmitting power of the sending entity must be sufficient for the signal effectively to reach the destination entity.

It is not, however necessary for the signal to reach the destination entity directly (this case being referred to as direct sending): it can, in practice, pass through a third party entity of the network, called an "intermediate node" or "routing node" (this case being referred to as indirect sending).

It should be noted that, in an ad hoc network, each entity can alternately serve as sending entity, destination entity or intermediate node.

In order to provide network connectivity, that is, ensure that, whatever the sending and destination entities, there is always a path enabling the message to be delivered to the receiving entity from the sending entity, it is necessary for each sending entity of the network to know the location of its adjacent entities, and vice versa.

An adjacent entity of a sending entity is any entity, for which the sending entity is near enough to receive a direct signal.

Each sending entity of the network has a corresponding sending zone, the radius of which is a function of the transmitting power of that entity.

Numerous communication protocols, with little regard for energy saving, allow for the transmitting power of any sending entity to be set in all cases to its maximum value.

While such protocols generally provide network connectivity, they do, however, involve a high energy consumption, which is detrimental to the autonomy of each entity of the network.

In the interests of energy saving, for the purpose of increasing the autonomy of the entities, it is therefore desirable to reduce the transmitting power of the network entities as much as possible while maintaining the connectivity of the network.

There are communication protocols that propose to modulate the transmitting power of a given entity according to the topology of its vicinity (see, for example, the International Patent Application published under the number WO 02/03567).

However, the protocol employed is relatively complicated and requires memories and complex algorithms which put a strain on the costs and hamper the operation of the network.

The invention seeks in particular to resolve the abovementioned drawbacks by proposing, among other subjects, a method of adjusting the transmitting power of a sending entity in a wireless communication network enabling the energy consumption within the network to be limited simply and effectively, while ensuring the connectivity of the network.

SUMMARY OF THE INVENTION

To this end, the invention proposes, according to a first aspect, a method of adjusting the power of a sending entity in a network of wireless communicating entities, including the steps of:
  identifying the entities adjacent to the sending entity, that is, the entities of the network, separate from the sending entity, from which the sending entity (e) is able to receive the messages;
  identifying, among the adjacent entities, a minimum constellation associated with the sending entity, that is, quantitatively, the smallest set of entities adjacent to the sending entity included in a circle centered on the latter, and at least three of which form a convex polygon circumscribing the sending entity;
  identifying, among the adjacent entities not belonging to the minimum constellation, any so-called peripheral entities, whose own minimum constellation includes the sending entity;
  adjusting the transmitting power of the sending entity to a minimum value enabling the messages sent by the sending entity (e) to reach both the entities of the minimum constellation associated with the sending entity and the identified peripheral entities.

This method, applied to each entity of a wireless network, ensures its connectivity while limiting the power consumed.

In an embodiment, after having adjusted its transmitting power, the sending entity sends each adjacent entity a message containing an identifier associated with said sending entity, the position of the sending entity and its minimum sending distance, that is, the radius of the smallest circle, centered on the sending entity, including the minimum constellation associated with the sending entity.

The identification of the adjacent entities consists, for example, in storing in a first table, for each adjacent entity, an identifier associated with this entity, the position of, this entity and its minimum sending distance, that is, the radius of the smallest circle, centered on this adjacent entity, including the minimum constellation associated with this adjacent entity.

Preferably, each adjacent entity sends the sending entity a message containing its identifier, its position and its minimum sending distance.

Moreover, the identification of the entities belonging to the minimum constellation associated with the sending entity can include the step of storing in a second table, for each adjacent entity belonging to the minimum constellation, its identifier, its position and its minimum sending distance, while the identification of the peripheral entities includes, for example, the step of storing in a third table, for each of these entities, its identifier, its position and its minimum sending distance.

As for the adjustment of the transmitting power, it can include the step of selecting either the greatest of the distances separating the sending entity from the entities of the third table or, when this third table is empty, the greatest of the distances separating the sending entity from the entities of the second table, the power adjustment being made in such a way as to adapt the sending range to the selected distance.

The method described above can further include additional steps, in which, after having adjusted its transmitting power:
- the sending entity sends each of the adjacent entities a message containing its identifier, its position and its minimum sending distance,
- the tables are emptied.

According to a second aspect, the invention further proposes a wireless communication unit intended to form an entity of a network of wireless communicating entities, comprising:
- means of identifying entities adjacent to said unit, that is, the entities of the network, separate from said communication unit, from which the latter is able to receive the messages;
- means of identifying a minimum constellation associated with said communication unit, that is, quantitatively, the smallest set of entities adjacent to said communication unit included in a circle centered on the latter, and at least three of which form a convex polygon circumscribing said communication unit;
- means of identifying, among the adjacent entities not belonging to the minimum constellation, any so-called peripheral entities, whose own minimum constellation includes said unit; and
- means of adjusting the transmitting power of said communication unit to a minimum value enabling the messages sent by the communication unit to reach both the entities of the minimum constellation associated with said communication unit and the identified peripheral entities.

DETAILED DESCRIPTION

Figure 1:
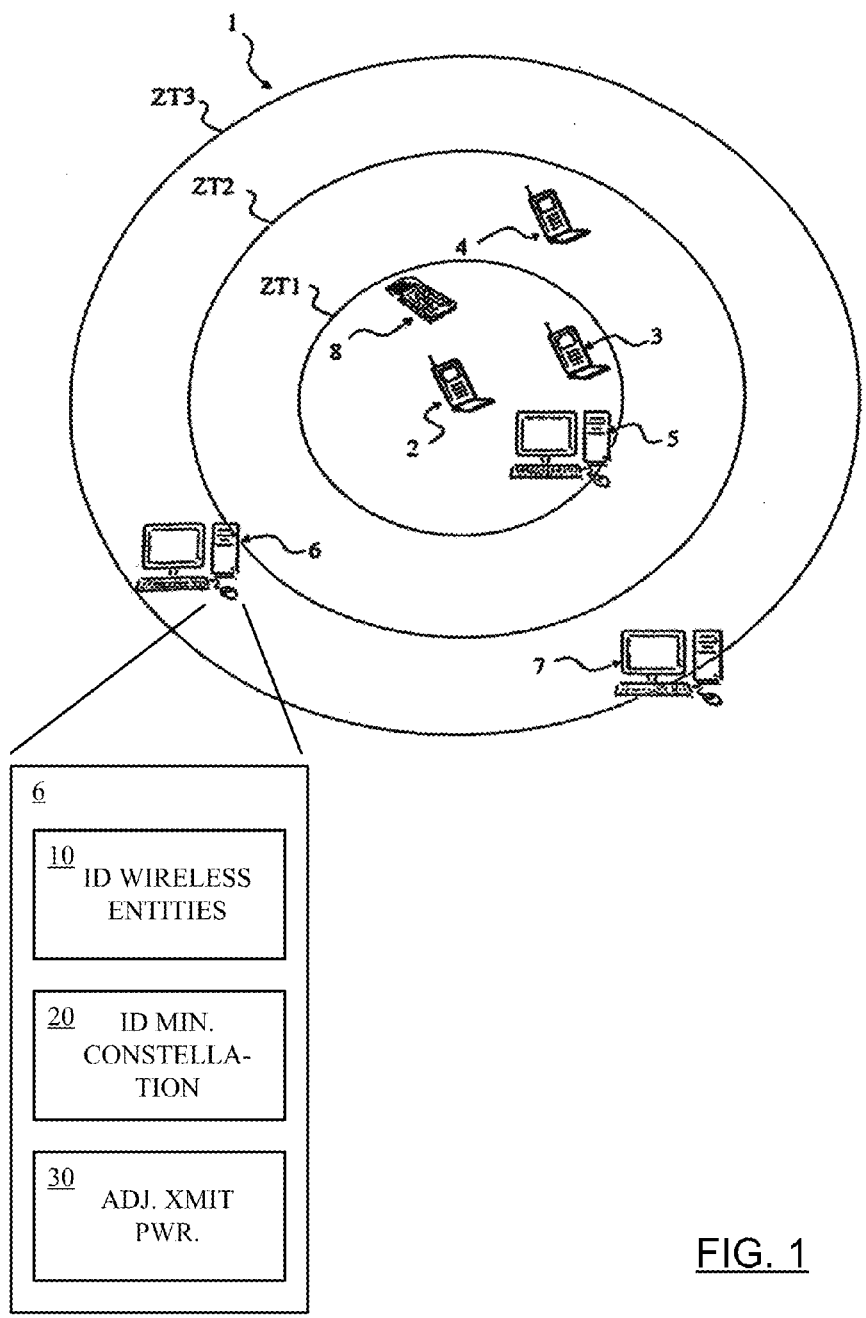
FIG. 1 is a diagram representing at least partially a network comprising a relatively small number of wireless communicating entities.

FIG. 1 partially shows an interconnected wireless local area network 1. It is, for example, an ad hoc type radio network compliant with the IEEE 802.11b radiofrequency communication standard, also called Wi-Fi (Wireless Fidelity).

The network 1 includes a plurality of entities, of which are shown three mobile telephones 2, 3, 4, three computers 5, 6, 7 fitted with Wi-Fi modems and a microwave remote control 8.

Figure 2:
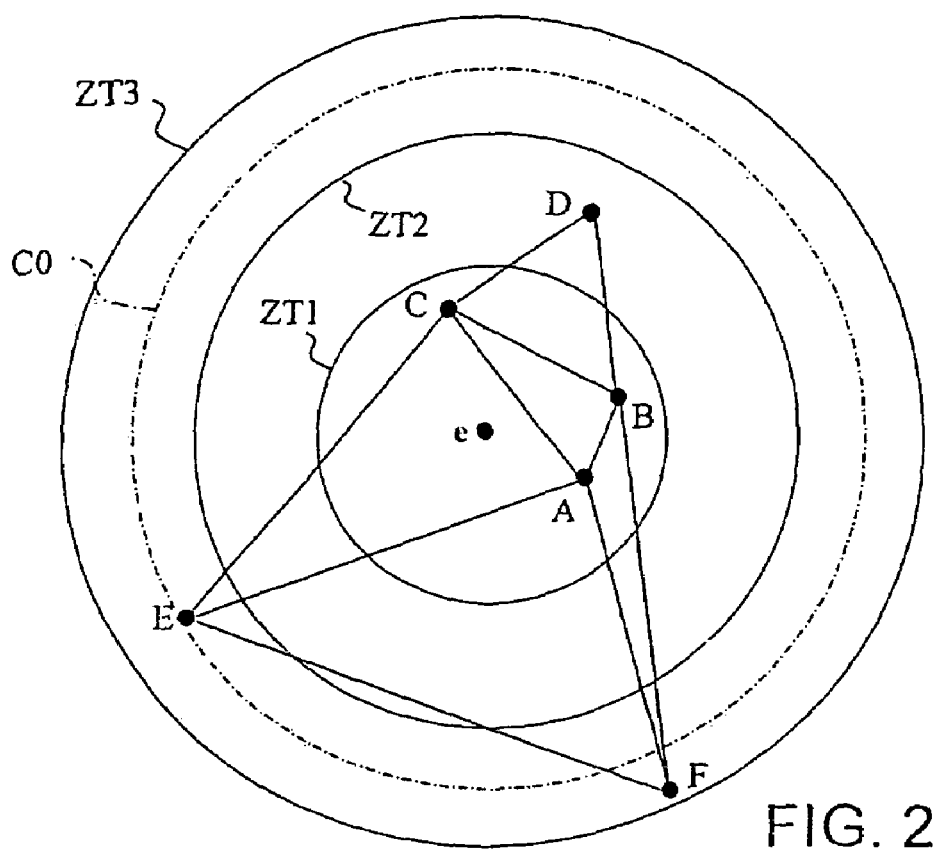
FIG. 2 is a diagram illustrating the topology of the network of FIG. 1, in which the entities are represented in node form.

FIG. 2 illustrates the topology of the network 1, the entities 2 to 7 here being represented in the form of nodes to which are respectively assigned the letters e, B, D, A, E, F, C.

In this example, the alphabetical order according to which the nodes A to F are classified corresponds to an increasing distance from the sending node e.

Each entity 2 to 8 is fitted with a wireless communication system, the sending power (also called transmitting power) of which is adjustable.

The sending or transmission zone of the node e is defined as the portion of the space in which a receiving node is (or would be) able to receive the signals sent from the node e.

Theoretically, the transmission zone is a sphere centered on the sending entity, the radius of which varies according to the transmitting power. In reality, since the network 1 is substantially flat, the transmission zone can be likened to a disk centered on the sending entity.

Any entity of the network can directly transmit a signal to a destination entity provided that the latter is inside the sending zone of the sending entity (this is then called direct transmission).

When a destination entity is not located in the transmission zone of the sending entity, the signal can pass through a routing node or through a cascade of routing nodes, each located in the transmission zone of the preceding one, the main thing being that the signal ultimately reaches the destination entity (this is then called indirect transmission.

FIG. 1 also shows that an entity 6 may include a computer program 10 for identifying wireless entities adjacent to said wireless communication unit, being the entities of the network, separate from said communication unit, from which said communication unit is able to receive the messages; and may include a computer program 20 for identifying a minimum constellation associated with said communication unit as, the smallest set of entities adjacent to said communication unit included in a circle centered on said communication unit such that at least three of the entities of said set form a convex polygon circumscribing said communication unit; and may include a computer program 30 for adjusting the transmitting power of said communication unit to a value sufficient for messages sent by the communication unit to reach all the entities of the minimum constellation associated with said communication unit.

FIGS. 1 and 2 also show a number of transmission zones ZT1, ZT2, ZT3, of increasing radii which, centered on the sending telephone 2 (respectively on the sending entity e), correspond to increasing transmitting powers of its communication system.

Moreover, the telephone 2 (respectively each sending entity e) has a corresponding set of adjacent entities, which are the entities from which the telephone is able to receive a signal.

Thus, in the example shown, the set of entities adjacent to the telephone 2 includes the telephones 3 and 4, the computers 5, 6 and 7, and the remote control 8 (respectively from a topological point of view, the set of nodes adjacent to the node e includes the nodes A to F).

The network 1 illustrated in FIG. 1 is proposed purely as an indication, so in the following description, the reasoning is mainly topological.

As can be seen in FIG. 2, the first transmission zone ZT1, with the smallest radius, contains the entities A, B and C, which together form a triangle, from which the sending entity e is excluded.

The transmission zone ZT2, of intermediate radius, contains the entities A, B, C and D, which together form a quadrilateral, from which the entity e is also excluded.

However, the transmission zone ZT3, of larger radius, contains the entities A to F which, together, form a constellation (in other words, a cloud of points) circumscribing the sending entity e, that is, a constellation within which it is possible to trace a convex polygon (at least one triangle) circumscribing the sending entity.

Thus, in the constellation ABCDEF, the triangle AEC circumscribes the sending entity e.

Among the set of constellations ABC, ABCD, ABCDE and ABCDEF, only the constellations ABCDE and ABCDEF circumscribe the sending entity e, the constellation ABCDE being that which contains the smallest number of entities or, in other words, the constellation ABCDE being the constellation for which the circle, centered on the sending entity, which strictly contains it, has the smallest radius (it is in this case the circle C0 of center e and radius. [eE]).

By convention, such a constellation is called the minimum constellation associated with the sending entity e.

As a general rule, the minimum constellation associated with a sending entity e is defined as being, of all the constellations that are included in a circle centered on the sending entity e and which circumscribe the latter (that is, of which at least three of the entities form a convex polygon circumscribing the sending entity e), the constellation that contains the smallest number of entities.

The aim is to ensure the permanent connectivity of a network made up of a plurality of entities $e_i$ (where i is a natural integer), so as to ensure that signals are delivered regardless of the sending entities e and receiving entities $e_i$. Physically, the aim is to adjust the transmitting power of a given sending entity in such a way that its sending zone encompasses at least its minimum constellation.

To this end, a connectivity criterion is defined, applicable to each entity of the network and the use of which is explained below.

This criterion is defined as follows:

Any entity $e_i$ satisfies the connectivity criterion if the radius of its transmission zone is adjusted in such a way that this transmission zone encompasses precisely the minimum constellation associated with the entity $e_i$.

Below is a description of the method of controlling the transmitting power whereby, for each entity, this adjustment can be made before this entity sends a message containing certain information listed below.

Although this method is applicable to each of the entities $e_i$ of the network, for convenience, this method is described for a given sending entity e of the network.

The first step is to identify the vicinity of the sending entity e, that is, the set of the N so-called adjacent entities $e_i$ (i=1 to N) from which the sending entity e is able to capture messages.

To this end, the following are entered in a first table L, for each entity $e_i$ (i=1 to N):
  its identifier $e_i$,
  the position $pos_i$ of the entity $e_i$, characterized, for example, by the two-dimensional Cartesian coordinates $(x_i, y_i)$ of the entity $e_i$ in a predetermined flat frame of reference relative to which are positioned all the entities of the network, and
  the minimum sending distance of the entity $e_i$, that is, the distance separating the entity $e_i$ from the most distant of the entities belonging to its associated minimum constellation.

This data, sent by each entity $e_i$ and received by the sending entity e, is stored in the latter. For example, the table L is stored in a memory that is provided in the sending entity e.

This data concerning the vicinity of the sending entity e is entered in the table L in ascending order of index number i according to the distance separating the sending entity e from the entities $e_i$. In other words, the index number i=1 is assigned to the entity nearest to the sending entity e, and i=N to the entity furthest away. This classification can be performed by means of a simple comparator, since it is possible to deduce the distance separating the sending entity e from each of the adjacent entities $e_i$ from their respective coordinates.

In practice, if the entities are identified by their Cartesian coordinates (the coordinates of the sending entity being denoted x, y and the coordinates of the adjacent entities $x_i$, $y_i$, i=1 to N), the distance $d_i$ separating the sending entity from the adjacent entity $e_i$ is given by the following standard formula:

$$d_i = \sqrt{(x-x_i)^2 + (y-y_i)^2}$$

Thus, the table L takes the form of a matrix with four Columns and N rows:

$$L = \begin{bmatrix} e_1 & x_1 & y_1 & p_1 \\ e_2 & x_2 & y_2 & p_2 \\ \cdots & \cdots & \cdots & \cdots \\ \cdots & \cdots & \cdots & \cdots \\ e_N & x_N & y_N & p_N \end{bmatrix}$$

The next step is to, identify, from the adjacent entities $e_i$, the entities belonging to the minimum constellation associated with the sending entity e.

To this end, a second table K is formed (with four columns and an as yet undefined number of rows) from the first table L, as follows.

The first step is to assign the value 1 to the index number i.

The data relating to $e_i$ is transferred to the table K, that is, it is entered in the table K and deleted from the table L.

This operation is repeated with, on each repeat, the index number i being incremented by one unit, as long as the entities of the thus formed table K do not allow compliance with the connectivity criterion for the sending entity e.

On each iteration, a check is carried out to see whether the connectivity criterion is satisfied. When the connectivity criterion is satisfied, incrementing is stopped.

The table K then contains the P entities $e_i$ (i=1 to P, where P≦N) that form the minimum constellation associated with the sending entity e.

The table K is used to calculate the minimum sending distance, denoted p, of the sending entity e. This minimum sending distance p is equal to the distance separating the entity e from the most distant entity of the minimum constellation, that Ls, in the table K, the furthest away from the sending entity e. Given the classification already carried out, this is the entity $e_p$ located on the last row of the table K.

If it has not been stored previously, the distance $d_p$ between the sending entity e and the entity $e_p$ furthest away from the sending entity e in the minimum constellation is then recalculated.

As an example, in the case of the network illustrated in FIG. 2, if the entity e is taken as the sending entity, its minimum sending distance is the distance separating the entity e from the entity E.

It should be noted that if P=N, then the table L is empty, and the table K is equal to the original table L.

Physically, this means that the minimum constellation of the sending entity e includes all of its vicinity, that is, all of the adjacent entities $e_i$, for i=1 to N.

In this case, the next step is to adjust the transmitting power of the entity e such that the radius R of its transmission zone ZT is (theoretically) equal to its minimum sending distance p. In practice, the transmitting power is adjusted to the minimum value which yet allows a message sent by the sending entity to reach all the entities of the minimum constellation associated with the sending entity.

The next step, for the entity e, consists in sending a message containing its own data, in other words, its identifier e, its position (x, y) and its minimum sending distance p.

This data is received by the entities $e_i$ included in the transmission zone ZT, in this case, by the entities $e_i$ forming the minimum constellation of the sending entity e.

If P<N, then the table L has not been fully emptied on forming the table K, and contains the data $e_i$, $x_i$, $y_i$ and $p_i$ concerning the N-P entities remaining after forming the table K, these entities being both adjacent to the sending entity e and located outside its minimum constellation.

Among these entities, it is desirable to identify those whose minimum constellation contains the sending entity e, if any such exist.

It is, in practice, desirable for the data, that is, the identifier e, position (x, y), minimum sending distance p, of the sending entity e to reach each of these peripheral entities, since, as we have just seen, this data is essential in calculating the minimum sending distance associated with each of these peripheral entities.

Thus, the next step is to assign the index number i the value P+1.

If it has not been stored previously, the distance $d_i$ between the sending entity e and each entity $e_i$ remaining in the table L (that is, each entity located outside the minimum constellation) is recalculated.

Then, this distance $d_i$ is compared with the minimum sending distance $p_i$ of the corresponding entity $e_i$. In other words, a check is carried out to see whether the sending entity e is contained in the minimum constellation associated with that entity $e_i$.

If $d_i > p_i$, then the sending entity e is located outside the minimum constellation associated with the entity $e_i$. It is therefore necessary only for the data concerning the sending entity e to reach the entity $e_i$.

As long as i is less than N, the index number i is therefore incremented by one unit and this operation is repeated for the next entity.

If, however, $d_i \leq p_i$, then the sending entity is effectively contained in the minimum constellation associated with the entity $e_i$. It is therefore essential to ensure that the signal sent by the sending entity e reaches (directly) the entity $e_i$.

The data concerning the entity $e_i$, in other words the identifier $e_i$, its position $x_i$, $y_i$ and its minimum sending distance $p_i$, is therefore entered in a third table J, which, like the table K, is a matrix with four columns and an as yet undefined number of rows.

As long as i is strictly less than N, the index number i is incremented by one unit and the operations that have just been described are repeated for the subsequent entities.

These operations are stopped when i=N, that is, when all the distances separating the sending entity e from the entities $e_i$ (i=P+1 to N) have been calculated and compared with the minimum sending distances $p_i$ associated with the entities $e_i$.

Two assumptions then emerge, depending on whether the third table J is empty or whether it contains at least one entity.

If the third table J is empty, then there is no peripheral entity. In other words, in the vicinity of the sending entity e, outside of its associated minimum constellation, there is no entity whose own minimum constellation contains the sending entity e.

In this case, the next step consists in adjusting the transmitting power of the entity e such that the radius R of its transmission zone ZT is (theoretically) equal to the minimum sending distance p. In practice, the transmitting power is adjusted to the minimum value that enables a message sent by the sending entity e to reach all the entities of the minimum constellation associated with the sending entity.

The next step consists, for the entity e, in sending its data, in other words its identifier e, its position x, y and its minimum sending distance p.

This data is received by the entities $e_i$ included in the transmission zone ZT, in this case the entities $e_i$ forming the minimum constellation of the sending entity e.

If the third table J, is not empty, then the subsequent steps consist in identifying, from the peripheral entities $e_i$, listed in the third table J, the entity $e_j$ furthest away from the sending entity e.

Given the classification already carried out, it is the entity $e_j$ located on the last row of the third table J, then in (re)calculating the distance $d_j$ separating the sending entity e from this most distant entity $e_j$, if this distance $d_j$ has not been stored before or when forming the first table L.

The next step is to adjust the transmitting power of the entity e so that the radius R of its transmission zone ZT is (theoretically) equal to the distance $d_j$.

In practice, the transmitting power is adjusted to the minimum value that enables a message sent by the sending entity e to reach all the peripheral entities identified for the sending entity e.

The next step then consists, for the entity e, in sending its data, that is, its identifier e, its position x, y and its minimum sending distance p.

This data is received by the entities $e_i$ included in the transmission zone ZT, including the peripheral entities $e_i$ which, outside the minimum constellation, need the data concerning the sending entity e to perform their own calculation of their minimum sending distance $p_i$, which is calculated according to the procedure described above, the method that has just been described being, in effect, applicable, as we have already indicated, to each entity $e_i$ of the network.

Once the sending entity e has sent its data, the tables that are not empty are emptied pending the subsequent repetition of the method.

Naturally, the interval between repeats of the method can be adjusted for each entity, in particular according to its own mobility, or more generally for all of the network.

Physically, in a geographically limited area network with a large number of mobile entities (for example, mobile telephones) relative to the total number of entities, the interval for the mobile entities can be set to a few seconds.

However, in a geographically wide area network with only a small number of mobile entities, this interval can reach several tens of seconds, even exceed a minute.

The method that has just been described, which is applied simultaneously and in parallel to this method to all the entities of the network is used to ensure the connectivity of the latter, because the transmitting power of each sending entity is adjusted so as to encompass at least the minimum constellation associated with that entity (which means that there is an assurance that the nearest entities surrounding the sending entity will be able to receive, and, where necessary, relay, the signal from the sending entity), and, when they exist, the peripheral entities for which the signal from the sending entity is necessary for the method to operate.

It may be that a sending entity e is located, at least temporarily, at the edge of the network, that is, that no minimum constellation can, topologically, be associated with it.

In this case, in order to ensure the operation of the network, the transmitting power of this entity e is set to its maximum before sending its data, the minimum sending distance p being adjusted to be equal to the radius of the corresponding transmission zone.

Naturally, any wireless communication unit (such as a mobile telephone or a computer) intended to implement the method that has just been described will be provided with means designed for this purpose, specifically for implementing each step of the method.

Physically, these means can take the form of a computer program loaded in a processor installed in this unit.

Two exemplary applications of the method just described to one and the same network are given below, illustrated in FIG. 4, comprising 20 entities referenced A to T and positioned in an orthogonal, flat frame of reference XY.

EXAMPLE 1

In this example, the entity A is chosen as the sending entity, and it is assumed that it is on the point of transmitting its data.

Figure 4:
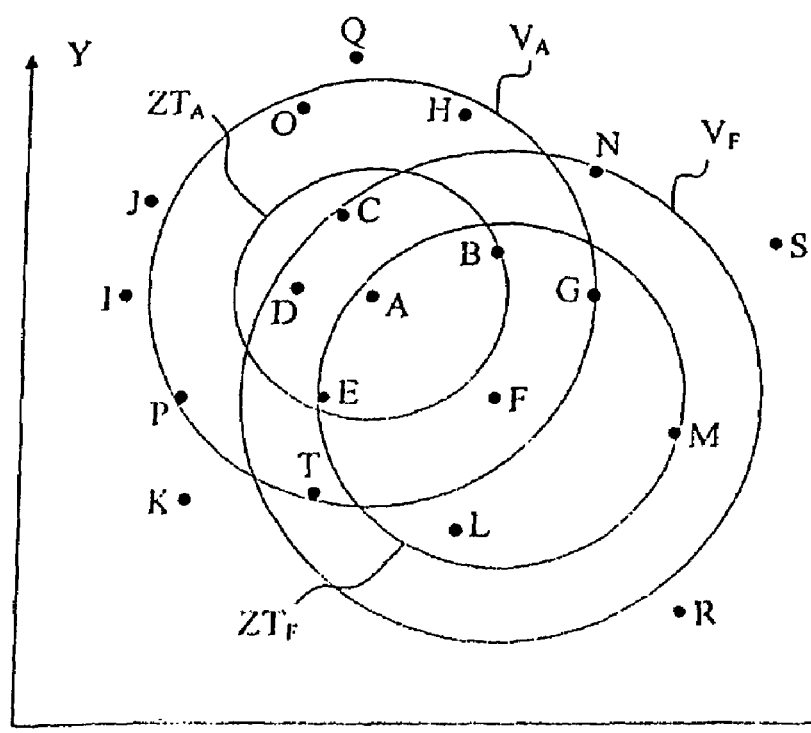
FIG. 4 is a diagram representing at least partially a network comprising a large number of wireless communicating entities.
Figure 3A:
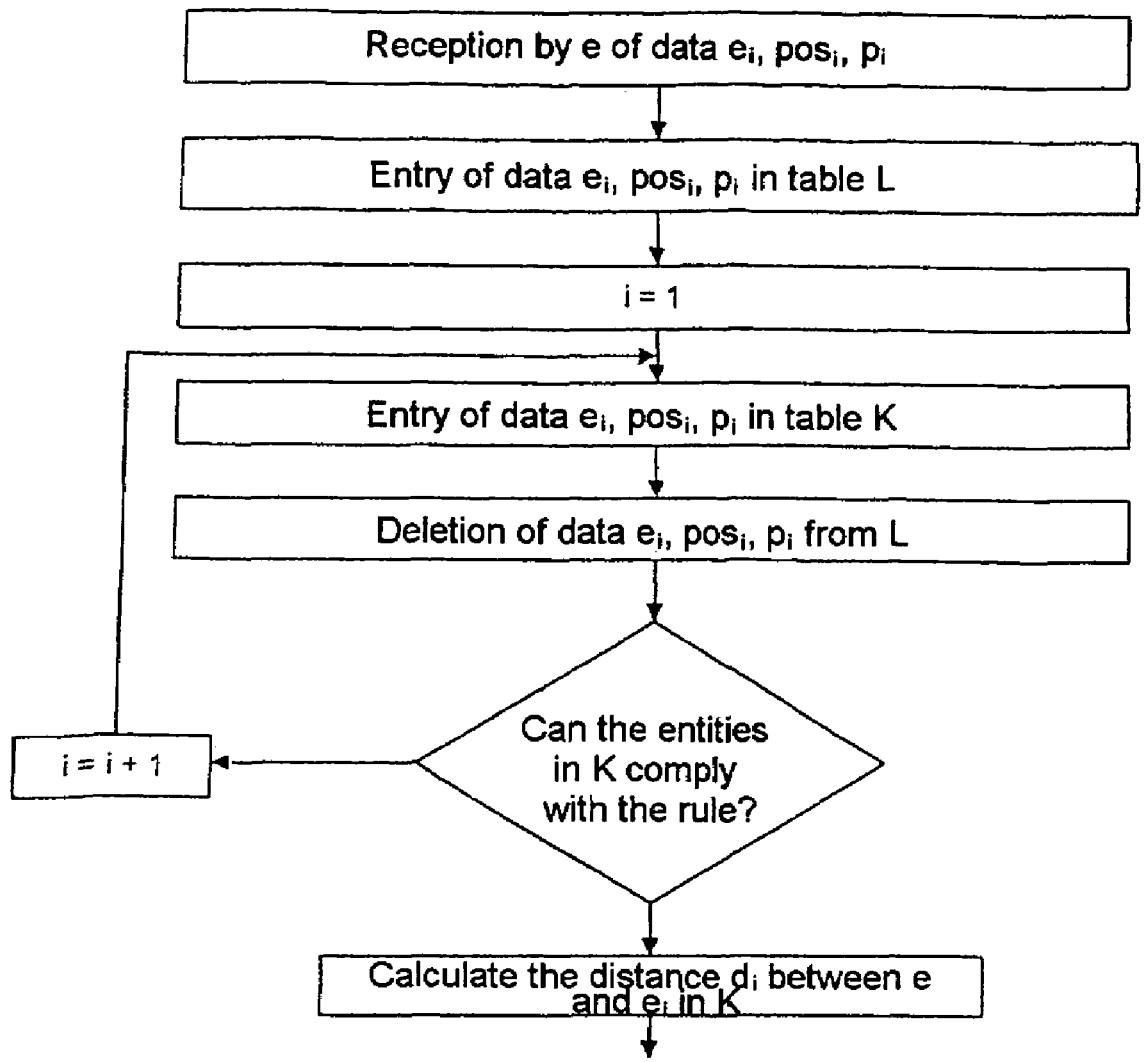
FIGS. 3a and 3b together form a flow diagram illustrating the various steps of the method of adjusting the transmitting power of a communicating entity of the network.
Figure 3B:
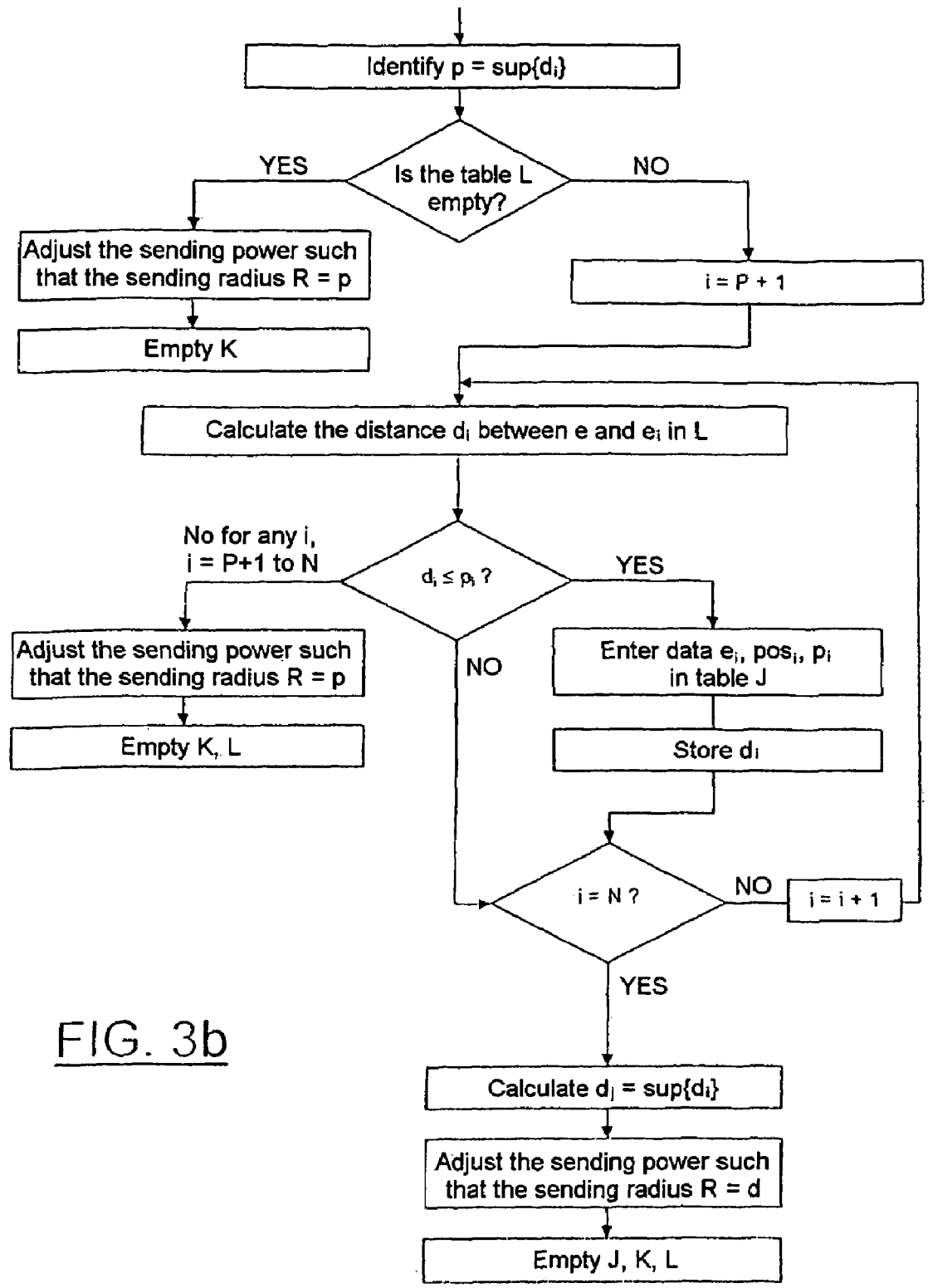

As can be seen in FIG. 4, the entity A has a corresponding vicinity $V_A$ which includes the entities B, C, D, E, F, G, H, O, P, T.

Below is a list, for each entity A, B, C, D, E, F, G, H, O, P, T, in the form of a set of three values (expressed, for example, in meters), of its coordinates in the XY frame of reference (the first two values), and its minimum sending distance (the third value):

A (47, 58, 18)
B (64, 65, 18)
C (43, 70, 22)
D (37, 60, 22)
E (41, 45, 15)
F (64, 44, 20)
G (72, 59, 28)
H (59, 84, 22)
O (37, 85, 14)
P (22, 45, 19)
T (40, 31, 20)

The sending entity A receives the data from the entities B, C, D, E, F, G, H, O, P, T in its vicinity $V_A$.

The first step is to assign each of the entities D, C, E, B, F, H, O, P, T, G (arranged in order of their distance from the sending entity A) the index numbers 1 to 10.

Then, the table L is constructed from the data received from the vicinity of the entity A. The result from the values given above is that the table L is created as follows:

$$L = \begin{bmatrix} e_1 & 37 & 60 & 22 \\ e_2 & 43 & 70 & 22 \\ e_3 & 41 & 45 & 15 \\ e_4 & 64 & 65 & 18 \\ e_5 & 64 & 44 & 20 \\ e_6 & 59 & 84 & 22 \\ e_7 & 37 & 85 & 14 \\ e_8 & 22 & 45 & 19 \\ e_9 & 40 & 31 & 20 \\ e_{10} & 72 & 59 & 27 \end{bmatrix}$$

From the table L, the table K is constructed in order to determine the minimum sending distance p of the entity A.

Successive iterations show (as appears geometrically in FIG. 4) that the minimum constellation of the entity A is made up of the entities $e_1$, $e_2$, $e_3$ and $e_4$, that is, the entities B, C, D, E.

The table K is therefore created as follows:

$$K = \begin{bmatrix} e_1 & 37 & 60 & 22 \\ e_2 & 43 & 70 & 22 \\ e_3 & 41 & 45 & 15 \\ e_4 & 64 & 65 & 18 \end{bmatrix}$$

whereas the table L is created as follows:

$$L = \begin{bmatrix} e_5 & 64 & 44 & 20 \\ e_6 & 59 & 84 & 22 \\ e_7 & 37 & 85 & 14 \\ e_8 & 22 & 45 & 19 \\ e_9 & 40 & 31 & 20 \\ e_{10} & 72 & 59 & 27 \end{bmatrix}$$

It is deduced from the table K that the entity furthest from the sending entity A is the entity $e_4$ (B), the distance $d_4$ separating the entities A and B being equal to 18 m.

The result is that the minimum sending distance p of the entity A, equal to $d_4$, is 18 m.

Any peripheral entities are then identified.

Successive calculations provide the distances separating the entity A from the entities $e_5$ (F) to $e_{10}$ (T), these distances being systematically compared to the values $p_5$ to $p_{10}$ of the minimum sending distances of the corresponding entities. The values $d_5$ to $d_{10}$ are as follows:

$d_5 = 22$ m $d_6 = 28$ m $d_7 = 28$ m $d_8 = 29$ m $d_9 = 29$ m $d_{10} = 30$ m

Now, it emerges from table L that the values of the minimum sending distances $p_5$ to $p_{10}$ are as follows:

$p_5 = 20$ m $p_6 = 22$ m $p_7 = 24$ m $p_8 = 19$ m $p_9 = 20$ m $p_{10} = 27$ m

Thus, whatever the value of i (i=5 to 10), $d_i$ is strictly greater than $p_i$, which means that none of the minimum constellations of the entities $e_5$ (F) to $e_{10}$ (G) contains the sending entity A. No table J is therefore constructed.

Also, the next step consists in adjusting the transmitting power of the entity A so that the radius of its transmission zone $ZT_A$ is equal to its minimum sending distance, that is, the distance $d_4$, separating the entities A and B.

The next step consists, for the entity A, in sending its data, that is, its identifier A, its position (identified by the Cartesian values 47 and 58), and its minimum-sending distance, the value of which is equal to 18.

This data is received by the entities included in the transmission zone of the entity A, in other words the entities B, C, D and E.

EXAMPLE 2

In this example, the entity F is chosen as the sending entity, and it is assumed that it is on the point of transmitting its data.

As can be seen in FIG. 4, the entity F has a corresponding vicinity $V_F$ which includes the entities A, B, C, D, E, G, L, M, N, T.

Below is a list, for each entity A, B, C, D, E, F, G, L, M, N, T, in the form of a set of three values (expressed, for example, in meters), of its coordinates in the XY frame of reference (the first two values), and its minimum sending distance (the third value):

---
A (47, 58, 18)
B (64, 65, 18)
C (43, 70, 22)
D (37, 60, 22)
E (41, 45, 15)
F (64, 44, 20)
G (72, 59, 28)
L (59, 22, 33)
M (89, 40, 38)
N (77, 76, 22)
T (40, 31, 20)
---

The sending entity F receives the data from the entities A, B, C, D, E, G, L, M, N, T, located in its vicinity $V_F$.

The first step is to assign each of the entities G, L, B, A, E, M, T, D, C, N (arranged in order of their distance from the sending entity F) the index numbers 1 to 10.

Then, the table L is constructed from the data received from the vicinity of the entity F. The result from the values given above is that the table L is created as follows:

$$L = \begin{bmatrix} e_1 & 72 & 59 & 28 \\ e_2 & 59 & 22 & 33 \\ e_3 & 64 & 65 & 18 \\ e_4 & 47 & 58 & 18 \\ e_5 & 41 & 45 & 15 \\ e_6 & 89 & 40 & 38 \\ e_7 & 40 & 31 & 20 \\ e_8 & 37 & 60 & 22 \\ e_9 & 43 & 70 & 22 \\ e_{10} & 77 & 76 & 22 \end{bmatrix}$$

From the table L, the table K is constructed, in order to determine the minimum sending distance p of the entity F.

Successive iterations show (as appears geometrically in FIG. 4) that the minimum constellation associated with the entity A is made up of the entities $e_1$, $e_2$ and $e_3$, that is, G, L and B (FIG. 4).

The table K is created as follows, the index numbers being reassigned to the entities B, G and L from 1:

$$K = \begin{bmatrix} e_1 & 72 & 59 & 28 \\ e_2 & 29 & 22 & 33 \\ e_3 & 64 & 65 & 18 \end{bmatrix}$$

whereas the table L is created as follows:

$$L = \begin{bmatrix} e_4 & 47 & 58 & 18 \\ e_5 & 41 & 45 & 15 \\ e_6 & 89 & 40 & 38 \\ e_7 & 40 & 31 & 20 \\ e_8 & 37 & 60 & 22 \\ e_9 & 43 & 70 & 22 \\ e_{10} & 77 & 76 & 22 \end{bmatrix}$$

The result from the table K is that the entity furthest from the sending entity F is the entity $e_3$ (B), the distance $d_3$ separating the entities F and B being equal to 20 m.

It is deduced from this that the minimum sending distance p of the entity F, equal to $d_3$, is 20 m.

Any peripheral entities are then identified.

Successive calculations provide the distances separating the entity F from the entities, identified in the table L above, $e_4$ (A) to $e_{10}$ (N), these distances being systematically compared to the values $p_4$ to $p_{10}$ of the minimum sending distances of the corresponding entities. The values $d_1$ to $d_7$ are as follows:

$d_4$=22 m $d_5$=23 m $d_6$=25 m $d_7$=23 m $d_8$=31 m $d_9$=33 m $d_{10}$=34 m

It emerges from the table L that the values of the minimum sending distances $p_1$ to $p_7$ are as follows:

$p_4$=18 m $p_5$=15 m $p_6$=38 m $p_7$=20 m $p_9$=22 m $p_{10}$=22 m

As can be seen, $d_6$ is less than $p_6$, which means that the sending entity F is contained in the minimum constellation of the entity $e_6$ (M).

Consequently, the entity $e_5$ is entered in the matrix J associated with the entity F.

Since this property is not satisfied for any other entity entered in the matrix L, the matrix J contains only the data associated with the entity M.

Consequently, the transmitting power of the entity F is set so that the radius R of its transmission zone $ZT_F$ is equal to the distance $d_6$, or 25 m.

The next step consists, for the entity F, in sending its data, in other words its identifier F, its position (the values 64 and 44) and its minimum sending distance, equal to 20.

This data is received by the entities included in the transmission zone $ZT_F$ of the entity F, in other words the entities A, B, E, G, L and M.

What is claimed is:

1. A method of adjusting a transmitting power of a wireless sending entity in a network of wireless communicating entities, including the steps of:
   a processor identifying entities adjacent to the wireless sending entity, being wireless entities of the network, separate from the sending entity, from which the sending entity is able to receive messages;
   the processor identifying, among the adjacent entities, a minimum constellation associated with the sending entity, as a smallest set of entities adjacent to the sending entity and included in a circle centered on the sending entity such that at least three of the entities of said smallest set form a convex polygon circumscribing the sending entity; and
   the processor adjusting the transmitting power of the sending entity to a value sufficient for messages sent by the sending entity to reach all the entities of the minimum constellation associated with the sending entity.

2. The method as claimed in claim 1, further including after the step of adjusting the transmitting power, the step of sending from the sending entity to each adjacent entity a message containing:
   an identifier associated with said sending entity,
   a position of the sending entity and
   a minimum sending distance of the sending entity, i.e. the radius of the smallest circle, centered on the sending entity, including the minimum constellation associated with the sending entity.

3. The method as claimed in claim 1, wherein the identification of the adjacent entities consists of storing in a first table, for each adjacent entity:
   an identifier associated with said adjacent entity,
   a position of said adjacent entity and
   a minimum sending distance of said adjacent entity, i.e. the radius of the smallest circle, centered on said adjacent entity which includes an another minimum constellation, where the another minimum constellation is another smallest set of entities that are adjacent to said adjacent entity and included in another circle which is centered on said adjacent entity such that at least three of the entities of said another smallest set of entities form another convex polygon which circumscribes said adjacent entity.

4. The method as claimed in claim 3, wherein each adjacent entity sends the sending entity a message containing:
   the identifier associated with the adjacent entity,
   the position of the adjacent entity and
   the minimum sending distance of said adjacent entity.

5. The method as claimed in claim 3, wherein the step of identifying the entities belonging to the minimum constellation associated with the sending entity includes the step of storing in a second table, for each adjacent entity belonging to the minimum constellation associated with the sending entity:
   the identifier associated with said adjacent entity,
   the position of said adjacent entity and
   the minimum sending distance of said adjacent entity.

6. The method as claimed in claim 5, further comprising the steps of:
   identifying, among adjacent entities not belonging to the minimum constellation associated with the sending entity any peripheral entities which are defined as adjacent entities having the another minimum constellation which includes the sending entity; and
   storing in a third table, for each of said entities:
      the identifier associated with said peripheral entity,
      the position of said peripheral entity, and
      the minimum sending distance of said peripheral entity.

7. The method as claimed in claim 6, wherein the adjustment of the transmitting power includes the step of selecting either the greatest of the distances separating the sending entity from the entities of the third table or, when said third table is empty, the greatest of the distances separating the sending entity from the entities of the second table, the power adjustment being made in such a way as to adapt a sending range to the selected distance.

8. The method as claimed in claim 7, further including after the step of adjusting the transmitting power:
   sending from the sending entity to each of the adjacent entities a message containing an identifier of said sending entity, a position of said sending entity and a minimum sending distance of said sending entity; and
   emptying the first, second and third tables.

9. The method as claimed in claim 1, further comprising the steps of:
   identifying, among adjacent entities not belonging to the minimum constellation associated with the sending entity, any peripheral entities defined as adjacent entities having an another minimum constellation which includes the sending entity, where the another minimum constellation is another smallest set of entities that are adjacent to said adjacent entity and included in another circle which is centered on said adjacent entity such that at least three of the entities of said another smallest set of entities form another convex polygon which circumscribes said adjacent entity.

10. The method as claimed in claim 9, wherein the value of the transmitting power is adjusted so that the messages sent by the sending entity also reach the identified peripheral entities.

11. The method as claimed in claim 10, wherein the value of the transmitting power is adjusted as a minimum power value such that the messages sent by the sending entity also reach the identified peripheral entities.

12. A wireless communication unit for a network of wireless communicating entities, comprising:
   means of identifying wireless entities adjacent to said wireless communication unit, being the entities of the network, separate from said communication unit, from which said communication unit is able to receive messages;
   means of identifying a minimum constellation associated with said communication unit as a smallest set of entities adjacent to said communication unit included in a circle centered on said communication unit such that at least three of the entities of said smallest set form a convex polygon circumscribing said communication unit;
   means of adjusting a transmitting power of said communication unit to a value sufficient for messages sent by the communication unit to reach all the entities of the minimum constellation associated with said communication unit.

13. The wireless communication unit as claimed in claim 12, further comprising;

means of identifying, among adjacent entities not belonging to the minimum constellation associated with the sending entity, any peripheral entities defined as adjacent entities having an another minimum constellation which includes the sending entity, where the another minimum constellation is another smallest set of entities that are adjacent to said adjacent entity and included in another circle which is centered on said adjacent entity such that at least three of the entities of said another smallest set of entities form another convex polygon which circumscribes said adjacent entity.

14. The wireless communication unit as claimed in claim 13, wherein the power value set by the adjusting means is such that the messages sent by the sending entity also reach the identified peripheral entities.

15. The wireless communication unit as claimed in claim 14, wherein the power value set by the adjusting means is a minimum power value such that the messages sent by the sending entity also reach the identified peripheral entities.

16. A network of wireless communicating entities, wherein each wireless communication entity comprises:

means of identifying wireless entities adjacent to said wireless communication entity being the entities of the network, separate from said communication entity, from which said communication entity is able to receive messages;

means of identifying a minimum constellation associated with said communication entity, as smallest set of entities adjacent to said communication entity included in a circle centered on said communication entity such that at least three of the entities of said smallest set form a convex polygon circumscribing said communication entity; and means of adjusting a transmitting power of said communication entity to a value sufficient for messages sent by said communication entity to reach all the entities of the minimum constellation associated with said communication entity.

17. A computer readable medium having a computer program embedded therein, the computer program product including instructions for carrying out the following steps upon execution by a processor incorporated in a sending entity belonging to a network of wireless communicating entities:

the processor identifying the entities adjacent to the sending wireless entity, being the wireless entities of the network, separate from the sending entity, from which the sending entity is able to receive messages;

the processor identifying, among the adjacent entities, a minimum constellation associated with the sending entity as a smallest set of entities adjacent to the sending entity and included in a circle centered on the sending entity such that at least three of the entities of said smallest set form a convex polygon circumscribing the sending entity; and the processor adjusting a transmitting power of the sending entity to a value sufficient for messages sent by the sending entity to reach all the entities of the minimum constellation associated with the sending entity.

18. The computer readable medium as claimed in claim 17, wherein said steps further include:

identifying, among adjacent entities not belonging to the minimum constellation associated with the sending entity, any peripheral entities defined as adjacent entities having an another minimum constellation which includes the sending entity, where the another minimum constellation is another smallest set of entities that are adjacent to said adjacent entity and included in another circle which is centered on said adjacent entity such that at least three of the entities of said another smallest set of entities form another convex polygon which circumscribes said adjacent entity.

19. The computer readable medium as claimed in claim 18, wherein the value of the transmitting power is adjusted so that the messages sent by the sending entity also reach the identified peripheral entities.

20. The computer readable medium as claimed in claim 19, wherein the value of the transmitting power is adjusted as a minimum power value such that the messages sent by the sending entity also reach the identified peripheral entities.

* * * * *